United States Patent Office 3,713,897
Patented Jan. 30, 1973

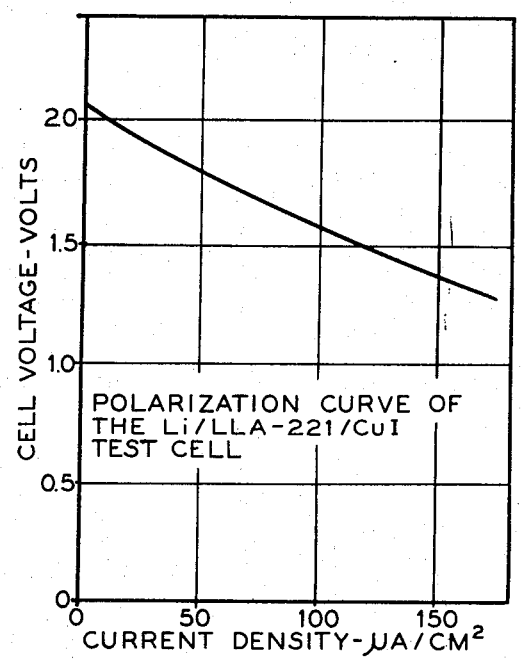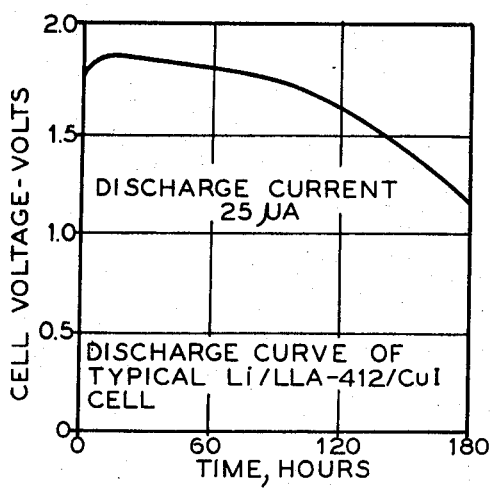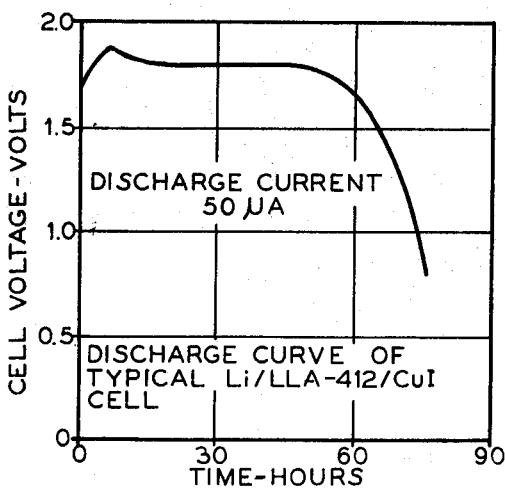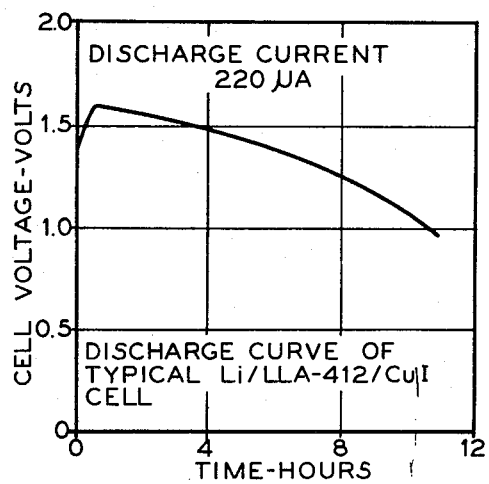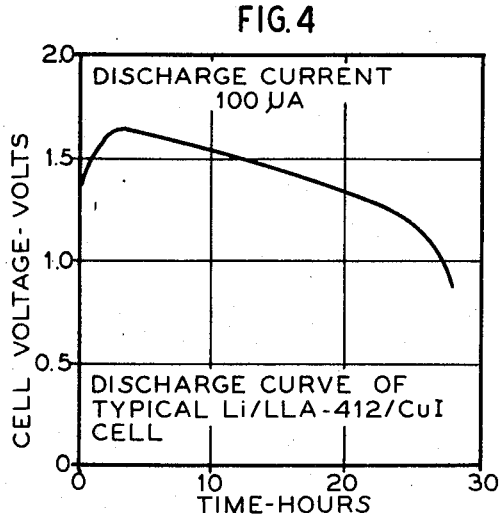

3,713,897
ELECTROLYTE MATERIALS FOR HIGH VOLTAGE SOLID ELECTROLYTE BATTERY SYSTEMS
Charles C. Liang, Andover, Mass., assignor to
P. R. Mallory & Co., Inc., Indianapolis, Ind.
Filed Oct. 15, 1970, Ser. No. 81,083
Int. Cl. H01m 11/00
U.S. Cl. 136—153       27 Claims

ABSTRACT OF THE DISCLOSURE

A solid electrolyte material containing lithium iodide, lithium hydroxide, and aluminum oxide, suitable for use in high voltage solid electrolyte systems, is a pure ionic conductor, with a conductivity of about $1 \times 10^{-5}$ ohm$^{-1}$ cm.$^{-1}$.

---

This invention relates to a new solid electrolyte material for use in high voltage solid electrolyte battery systems.

Miniaturization in electronics has been rapidly advancing in recent years and has resulted in increased demand for special power sources characterized by volume and weight comparable to those of electronic components employed in the circuitry. Some degree of success in meeting this demand has been achieved by employing solid electrolyte cells. Apart from the advantage of miniaturization, solid electrolyte cells and batteries permit great flexibility in design and possess extremely long shelf-life of the order of five to ten years.

The electrolytes employed in solid state cells are ionic conductors which facilitate the ionic flow during the operation of the solid state cells. The performance of any given cell depends on the specific resistance of the electrolyte; the nature of the conducting species and their transport number, the temperature of the cell, and the products of the cell reactions.

It is an object of the present invention to improve solid electrolyte cells.

It is another object of the present invention to provide a solid electrolyte cell characterized by high energy density.

It is another object of the present invention to provide a solid electrolyte cell embodying a cathode and a separator characterized by high ionic conductivities.

It is a further object of the present invention to provide novel and improved high energy solid electrolyte cells and batteries having an extremely long shelf life, a large and continuous output of electrical energy for its size, and which may be readily manufactured and sold on a practical and commercial scale at a low cost.

A solid electrolyte for use in an electrolyte cell, between two electrodes that serve as anode and cathode, respectively, should have a high electronic resistance, between the electrodes, but yet function as an electrolyte with high ionic conductivity between the electrodes.

The primary specific object of this invention is to provide a solid electrolyte material having an ionic conductivity at least one order of magnitude higher than present conventional electrolytes in its class, whereby the electrolyte of this invention can be used in high voltage solid electrolyte systems that will permit a current drain greater than presently available from other conventional electrolytes in this class.

The solid electrolyte of this invention contains LiI, LiOH, and $Al_2O_3$. It is practically a pure ionic conductor with a conductivity ranged between $5 \times 10^{-6}$ ohm$^{-1}$ cm.$^{-1}$ and $1 \times 10^{-5}$ ohm$^{-1}$ cm.$^{-1}$ at room temperature.

The electrolyte material of this invention may be prepared by the following procedure:

A sufficient amount of $CH_3OH$ is added to a mixture of 18.8 g. of $LiI \cdot 3H_2O$, 4.2 g. of $LiOH \cdot H_2O$ and 5 g. of $Al_2O_3$ with the mole ratio of LiI: LiOH:$Al_2O_3=2:2:1$ to form a slurry. The slurry is dried on a hot plate and then 50 ml. of water is added. The mixture is heated on a hot plate for two to three hours to form a paste. The paste is then first dried in an oven at about 140° C. for about two hours, and then further dried at 300° C. in an argon atmosphere.

The conductivity of a $2LiI \cdot 2LiOH \cdot Al_2O_3$ electrolyte, thus formed, was determined by measuring the resistance of a pellet of that material compressed under a pressure of 50,000 lbs./in.$^2$. At $25 \pm 1°$ C., the conductivity was found to be about $5 \times 10^{-6}$ ohm$^{-1}$ cm.$^{-1}$. The density of the pellet formed under the pressure of 50,000 lbs./in.$^2$ was found to be 3.3 g./cc.

A test cell made according to the following system,

Li _____ Anode.
$2LiI \cdot 2LiOH \cdot Al_2O_3$ _____ Electrolyte.
CuI _____ Cathode.

and tested under load, showed a voltage versus current density curve as shown in FIG. 1, with the current density in microamperes. The test cell used for this purpose had a surface area 0.71 cm.$^2$. The electrolyte layer was made up of 30 mg. of the material with a thickness of about 5 mils. In the cathode mixture, 100 mg. were used, in which the mixture included 10 percent by weight CuI, 30 percent by weight Cu, and 60 percent by weight of the electrolyte material of this invention. The anode can be either pure lithium, or a mixture containing lithium electrolyte and an electronic conductor.

The open circuit voltage of the cell was found to be 2.05 v., which is in good agreement with the theoretical value of the Li/CuI system, which would indicate that the electronic conductivity of this electrolyte is negligible, and that the electrolyte is, for all practical purposes, a pure ionic conductor.

Due to the ionic conductivity of the electrolyte, the current capability of the Li/$2LiI \cdot 2LiOH \cdot Al_2O_3$/CuI system is much higher than that of the Li/LiI/CuI system. Under a current drain of 100 $\mu a./cm.^2$ the $$2LiI \cdot 2LiOH \cdot Al_2O_3CuI$$

test cell showed an IR loss, or drop in voltage, of less than 0.6 v. On the other hand, the IR loss of Li/LiI/CuI would have been over 2 v. under a current drain of less than 20 $\mu a./cm.^2$.

Several graphs in the drawings show the effects of various current drains on cells utilizing an electrolyte of this invention. In the drawings, FIG. 1 shows a graph of the polarization curve of the cell voltage against current density, for a cell utilizing solid electrolyte material of this invention, between a lithium anode and a copper iodide cathode;

FIG. 2 is a graph of a discharge curve of a cell utilizing another electrolyte material of this invention showing a time graph for a discharge current of 25 micro-amperes;

FIG. 3 is a graph of a similar discharge curve of a similar typical cell of this material for a discharge current of 50 micro-amperes;

FIG. 4 is a graph of a similar discharge curve of a similar cell for a discharge current of 100 micro-amperes;

FIG. 5 is a graph of a discharge curve of another typical cell for a discharge current of 220 micro-amperes.

Several different electrloytes are here listed, in which the compositions were made up as shown in the four following examples, in which the electrolyte numbers are merely for applicant's identification of the particular composition:

(1) (Electrolyte No. LLA–412)—$4LiI \cdot LiOH \cdot 2Al_2O_3$ (LiI 57.17 mole percent; LiOH 14.29 mole percent; $Al_2O_3$ 28.57 mole percent).

(2) (Electrolyte No. LA–42)—$4LiI \cdot 2Al_2O_3$ (LiI 66.67 mole percent; LiOH 0 mole percent; $Al_2O_3$ 33.33 mole percent).

(3) (Electrolyte No. LLA–411)—$4LiI \cdot LiOH \cdot Al_2O_3$ (LiI 66.67 mole percent; LiOH 16.66 mole percent; $Al_2O_3$ 16.66 mole percent).

(4) (Electrolyte No. LLA–221)—$2LiI \cdot 2LiOH \cdot Al_2O_3$ (LiI 40 mole percent; LiOH 40 mole percent; $Al_2O_3$ 20 mole percent).

The electrolytes were found to be practically pure ionic conductors. Their ionic conductivities at 25° C. were:

LLA–412—$1 \times 10^{-5}$ ohm$^{-1}$ cm.$^{-1}$
LA–42—$1 \times 10^{-5}$ ohm$^{-1}$ cm.$^{-1}$
LLA–411—$5 \times 10^{-6}$ ohm$^{-1}$ cm.$^{-1}$
LLA–221—$5 \times 10^{-6}$ ohm$^{-1}$ cm.$^{-1}$ The electrolytes were prepared from request grade LiI and LiOH and Fisher absorption grade $Al_2O_3$.

An electrolyte found to be satisfactory was also made according to the following procedure:

A well blended powder mixture of anhydrous LiI, anhydrous LiOH and dry $Al_2O_3$ were heated to a temperature above the melting point of LiI (450° to 500° C.) under an inert atmosphere (e.g. Ar, He or $N_2$).

The discharge curves of the Li/LLA–412/CuI test cells at various current densities are shown in FIGS. 2 to 5. The test cell dimensions and the electrode compositions were as follows:

|  | Cathode | Electrolyte | Anode |
|---|---|---|---|
| Composition | 50 weight percent CuI and 50 weight percent LLA–412 (above). | LLA–412 | Li. |
| Weight | 60 mg | 62 mg | 8 mg. |
| Volume | $12.5 \times 10^{-3}$ cm.$^3$ | $20 \times 10^{-3}$ cm.$^3$ | $1.5 \times 10^{-3}$ cm.$^3$. |
| Surface area | 1.25 cm.$^2$ | 1.25 cm.$^2$ | 1.25 cm.$^2$. |
| Thickness | $10 \times 10^{-3}$ cm | $16 \times 10^{-3}$ cm | $12 \times 10^{-3}$ cm. |
| Stoichiometric capacity | 4.3 mah |  | Excess. |

The conductivity of the new electrolyte is 50 to 100 times higher than that of LiI. The increase in conductivity may be caused by:

(a) A chemical reaction between LiI and $Al_2O_3$ or LiI, LiOH and $Al_2O_3$ producing a more conductive complex; or (b) Absorption of LiI and LiOH by $Al_2O_3$ resulting in an increase in the "internal surface area" of LiI; or (c) An increase of the cation vacancies in the LiI lattice by the incorporation of the additives.

The percentages of the respective components of the mixture do not appear to be critical. The advantageous operation of this electrolyte appears to be due to the relationship and possible interaction between the ingredients, more than merely the result of exactly the specific proportions indicated to be effective and satisfactory.

Many other active cathode materials have been tested and provide satisfactory results. These other active cathode materials include iodine; metal iodides such as $PbI_2$, AgI, $SnI_2$, $SbI_3$, $HgI_2$; metal polyiodides such as $CsI_3$, $RbI_3$, Ammonium and organic ammonium polyiodides such as $NH_4I_3$ and $(CH_3)_4NI_3$. Test results have shown that the Li/LLA–412/$PbI_2$ solid cell has a very long shelf life.

Thus, some variations may be made in the percentages of the ingredients composing the electrolyte without departing from the spirit and scope of the invention as set forth in the appended claims.

What is claimed is:

1. A solid electrolyte material for a solid electrolyte battery system comprising a composition consisting of essentially LiI and $Al_2O_3$, said electrolyte having an ionic conductivity falling within the range of $5 \times 10^{-6}$ ohm$^{-1}$ cm.$^{-1}$ to $1 \times 10^{-5}$ ohm$^{-1}$ cm.$^{-1}$.

2. The solid electrolyte material in claim 1 which further comprises the additional ingredient of lithium hydroxide.

3. A solid electrolyte material having the ingredients of claim 2 in proportions to establish a mole ratio of the ingredients LiI:LiOH:$Al_2O_3$=4:1:2.

4. A solid electrolyte material for a solid electrolyte battery system consisting of essentially lithium iodide, aluminum oxide, and lithium hydroxide, and characterized by an ionic conductivity of $1 \times 10^{-5}$ ohm$^{-1}$ cm.$^{-1}$ at a temperature of 25 plus or minus about one degree centigrade.

5. A solid electrolyte material as in claim 4, compressed to a working density in the order of 3.3 g./cc.

6. A solid electrolyte material comprising a composition containing lithium iodide and aluminum oxide as ingredients.

7. A solid electrolyte material as in claim 6, wherein the proportions of the ingredients establish a mole ratio of LiI:$Al_2O_3$=4:2.

8. A solid electrolyte material as in claim 6, further comprising the additional ingredient of lithium hydroxide.

9. A solid electrolyte material as in claim 8, wherein the proportions of the ingredients establish a mole ratio of LiI:LiOH:$Al_2O_3$=4:1:2.

10. A solid electrolyte material as in claim 8, wherein the proportions of the ingredients establish a mole ratio of LiI:LiOH:$Al_2O_3$=4:1:1.

11. A solid electrolyte material as in claim 8, wherein the proportions of the ingredients establish a mole ratio of LiI:LiOH:$Al_2O_3$=2:2:1.

12. A solid electrolyte material comprising a solid solution composition containing aluminum oxide and lithium iodide as ingredients with the aluminum oxide ingredient ranging between 0 and 50 mole percent and with the balance being the lithium iodide ingredient.

13. A solid electrolyte material comprising a solid solution composition containing lithium iodide and aluminum oxide as ingredients, the proportions of the ingredients establishing a mole ratio of LiI:$Al_2O_3$=4:3.

14. A solid electrolyte material comprising a solid solution composition containing aluminum oxide, lithium hydroxide, and lithium iodide as ingredients with the aluminum oxide ingredient ranging between 0 and 50 mole percent, with the lithium hydroxide ingredient ranging between 0 and 40 percent, and with the balance being the lithium iodide ingredient.

15. A solid electrolyte cell, comprising a lithium anode; a cathode; and a solid solution electrolyte as an ion conducting separator between said anode and cathode consisting of essentially LiI·LiOH·$Al_2O_3$.

16. A solid electrolyte cell, comprising a lithium anode; a cathode; and a solid electrolyte consisting of $$4LiI \cdot 2Al_2O_3$$

17. A solid electrolyte cell as in claim 15, wherein the solid electrolyte comprises $4LiI \cdot LiOH \cdot 2Al_2O_3$.

18. A solid electrolyte cell as in claim 15, wherein the solid electrolyte comprises $2LiI \cdot 2LiOH \cdot Al_2O_3$.

19. A solid electrolyte cell as in claim 15, wherein the solid electrolyte comprises $4LiI \cdot LiOH \cdot Al_2O_3$.

20. A solid electrolyte cell comprising an anode consisting of Li as the active material; a cathode; and a solid electrolyte between said anode and cathode, said solid electrolyte consisting of essentially LiI and $Al_2O_3$ as ingredients therein.

21. A solid electrolyte cell as in claim 20, wherein said cathode contains copper iodide as an active material.

22. A solid electrolyte cell as in claim 20, wherein said cathode contains $PbI_2$ as an active material.

23. A solid electrolyte cell as in claim 20, wherein said cathode contains an active material selected from the group consisting of metal iodides, metal polyiodides, ammonium polyiodides, and organic ammonium polyiodides.

24. A solid electrolyte battery comprising a lithium anode, an electrolyte consisting of a hydroxide of the light metal forming the anode and of $Al_2O_3$, said electrolyte being substantially a pure ionic conductor having a conductivity of between $5 \times 10^{-6}$ ohm$^{-1}$ cm.$^{-1}$ and $1 \times 10^{-5}$ ohm$^{-1}$ cm.$^{-1}$ at room temperature, and a suitable collector therein, the output from said battery giving a substantially improved high voltage permitting a current drain greater than presently available from other cells.

25. A method of preparing a solid electrolyte material for use in a battery having a lithium anode and a collector for said electrolyte comprising the steps of preparing a mixture of $CH_3OH$, $LiI \cdot 3H_2O$, $LiOH \cdot H_2O$ and $Al_2O_3$ to form a slurry, drying said slurry, adding water thereto, heating the same for a period necessary to form a paste, drying said paste in an oven at 140° C., and then second drying the same in an inert atmosphere at 300° C.

26. A method of preparing a solid electrolyte material for use in a battery having a lithium anode and a collector for said electrolyte comprising the steps of preparing a well-blended powder mixture of LiI, LiOH and $Al_2O_3$, heating said mixture to a temperature above the melting point of LiI under an inert atmosphere.

27. A method of preparing a solid electrolyte material for use in a battery having a lithium anode and a collector for said electrolyte comprising the steps of preparing a well-blended powder mixture of anhydrous LiI, anhydrous LiOH, and dry $Al_2O_3$, heating said mixture to a temperature above the melting point of LiI under an inert atmosphere, said temperature being from about 450° C. to about 500° C.

References Cited

UNITED STATES PATENTS

| | | | |
|---|---|---|---|
| 3,567,518 | 3/1971 | Smyth et al. | 136—153 |
| 3,455,742 | 7/1969 | Rao | 136—153 |
| 3,499,796 | 3/1970 | Hever et al. | 136—153 |
| 3,513,027 | 5/1970 | Liang et al. | 136—153 |

DONALD L. WALTON, Primary Examiner

U.S. Cl. X.R.

136—83 R